US008876069B2

(12) United States Patent
Cimaglio

(10) Patent No.: US 8,876,069 B2
(45) Date of Patent: Nov. 4, 2014

(54) CONTAINER MIXING STAND

(75) Inventor: Scott D. Cimaglio, Antioch, IL (US)

(73) Assignee: United States Gypsum Company, Chicago, IL (US)

(*) Notice: Subject to any disclaimer, the term of this patent is extended or adjusted under 35 U.S.C. 154(b) by 317 days.

(21) Appl. No.: 13/444,452

(22) Filed: Apr. 11, 2012

(65) Prior Publication Data

US 2013/0270403 A1 Oct. 17, 2013

(51) Int. Cl.

| | |
|---|---|
| *A47F 5/00* | (2006.01) |
| *A47F 7/00* | (2006.01) |
| *F16M 11/00* | (2006.01) |
| *F16M 13/00* | (2006.01) |

(52) U.S. Cl.

USPC ................. 248/125.2; 248/122.1; 248/346.03

(58) Field of Classification Search

USPC ........ 248/122.1, 125.2, 124.1, 500, 146, 154, 248/346.07, 346.03, 346.01, 346.06, 310, 248/688, 519; 220/571, 571.1, 495.02, 544, 220/545, 546, 549, 550; 118/500, 232; 269/99, 243, 254 R, 86, 89, 90, 91, 92, 269/87.1, 87.2, 87.3

See application file for complete search history.

(56) References Cited

U.S. PATENT DOCUMENTS 371,310 A * 10/1887 Fitzgerald ....................... 269/90
1,828,249 A * 10/1931 Hammond .................... 248/154
2,024,903 A * 12/1935 Algeo ........................... 118/500
2,267,355 A * 12/1941 Van Riper ..................... 414/420
2,799,189 A * 7/1957 Goodman, Sr. ................ 81/3.32
3,295,691 A * 1/1967 Bowman ................... 211/85.19
3,301,103 A 1/1967 Shultz et al.
3,520,505 A * 7/1970 Allen ............................ 248/146
3,848,564 A * 11/1974 Kull ................................ 118/13
4,435,904 A * 3/1984 Logan et al. .................... 33/784
4,515,195 A * 5/1985 Gladstein ...................... 144/366
5,111,942 A * 5/1992 Bernardin .................... 211/59.3
5,232,188 A 8/1993 Troncone
5,685,518 A * 11/1997 Fox et al. ...................... 248/523
5,924,659 A * 7/1999 Babcock ....................... 248/146
6,227,513 B1 5/2001 Richard
6,464,184 B1 10/2002 Lytle
6,988,702 B2 * 1/2006 Schulz .......................... 248/525
7,018,090 B2 3/2006 Moore
7,258,312 B2 8/2007 Grosse
7,261,262 B2 8/2007 Dunson
7,341,234 B2 * 3/2008 Kowalski ...................... 248/523
7,347,400 B2 * 3/2008 Thurner et al. ............... 248/525
7,494,097 B2 2/2009 Lidie et al.
7,494,103 B1 2/2009 Huebner
7,651,060 B2 1/2010 Roth et al.
7,708,242 B1 5/2010 Petrashune et al.

(Continued)

*Primary Examiner* — Nkeisha Smith

(74) *Attorney, Agent, or Firm* — Greer, Burns & Crain, Ltd.; Pradip Sahu; Philip T. Petti

(57) ABSTRACT

A container mixing stand for securing a container for mixing includes a base plate, a first holding member connected to the base plate and a second holding member movably connected to the base plate and spaced from the first holding member for receiving a container between the first and second holding members. The stand also includes a first pulley assembly having a lever arm movable between a rest position and a tensioning position, and a second pulley assembly coupled with both the second holding member and the first pulley assembly. Movement of the first pulley assembly from the rest position to the tensioning position causes the second pulley assembly to move the second holding member into contact with the container for securing the container in position during mixing.

17 Claims, 5 Drawing Sheets

(56) References Cited

U.S. PATENT DOCUMENTS

| | | | | |
|---|---|---|---|---|
| 8,641,005 | B2 * | 2/2014 | Cimaglio | 248/346.01 |
| 2004/0084599 | A1 | 5/2004 | Tedesco et al. | |
| 2004/0099782 | A1 * | 5/2004 | Schulz | 248/346.06 |
| 2006/0124808 | A1 | 6/2006 | Hibbler | |
| 2007/0252051 | A1 | 11/2007 | Kuipers | |
| 2008/0042035 | A1 | 2/2008 | Elwood | |
| 2009/0256034 | A1 | 10/2009 | Poyner | |
| 2013/0306829 | A1 * | 11/2013 | Sie et al. | 248/550 |

* cited by examiner

CONTAINER MIXING STAND

BACKGROUND

This invention relates generally to devices for securing containers in position for mixing and other operations, and specifically to a stand for securing a container in position for securely mixing joint compound or other compositions in the container.

In the construction industry, building materials such as paint, plaster, mortar, joint compound or other products are typically mixed on site in containers such as pails or buckets. In many such building materials, often a dry, powdered product is mixed with water on site. Depending on the amount of water added, joint compound is often a highly viscous material and therefore is difficult to mix. The methods of mixing joint compound vary and typically include using a hand "masher" type mixer or a drill mixer. The hand "masher" type mixer includes an elongated handle with a generally planar, perforated, paddle-like working end. A user holds the handle of the hand "masher" and reciprocally moves the planar end in the joint compound in a mashing motion to mix the joint compound. A drill mixer typically includes a power drill having an elongated drill bit with mixing blades at one end for mixing the joint compound.

Mixing such viscous materials by hand or with a drill typically causes the container to move about due to forces generated by the above-described pumping or rotating mixing action. As a result, the person mixing the joint compound is forced to stabilize the container by either holding the container using their free hand, holding the container between their feet or legs, or putting one of their feet on the edge of the container. This makes the mixing process difficult, awkward and potentially messy due to spills. One solution to this problem is to have a second person hold the container during the mixing operation. However, utilizing two people to perform the mixing operation is inefficient, and thereby wastes time and money.

Accordingly, there is a need for a mixing stand that secures a mixing container in place while allowing a single operator to stably mix the material in the container.

SUMMARY

The present container mixing stand is a portable platform having spaced holding members that are configured to receive and, under user control, secure a container between the holding members with user-generated clamping force. In this manner, the container is stabilized for mixing container contents.

More specifically, a container mixing stand is provided that includes a base plate, a first holding member connected to the base plate and a second holding member movably connected to the base plate and spaced from the first holding member for receiving a container between the first and second holding members. A first pulley assembly on the stand has a lever arm movable between a rest position and a tensioning position, and a second pulley assembly is coupled with both the second holding member and the first pulley assembly. Movement of the first pulley assembly from the rest position to the tensioning position causes the second pulley assembly to move the second holding member into contact with the container for securing the container in position during mixing.

In another embodiment, a container mixing stand is provided that includes a base plate, a first holding member and a second holding member connected to the base plate, where one of the first and second holding members is movably connected to the base plate. The first and second holding members are spaced apart for receiving a container. The stand also includes a first pulley assembly including a mounting bracket connected to the base plate, and a first pulley rotatably connected to both the mounting bracket and a lever arm, where the lever arm is movable between a rest position and a tensioning position. A second pulley assembly is coupled with the second holding member and the first pulley assembly. The second pulley assembly includes a second mounting bracket connected to the base plate, and a second pulley rotatably connected to the second mounting bracket. Movement of the lever arm from the rest position to the tensioning position causes the second pulley to move the second holding member into contact with the container for securing the container in position during mixing.

DETAILED DESCRIPTION

The present mixing container stand is configured for receiving and securing a container, such as a bucket or pail, in place while allowing a user to efficiently mix material in the container. More specifically, the container mixing stand is used for mixing highly viscous compositions such as mortar, paint, plaster, joint compound or other powder or granular construction products in a container, so that the container is held securely in position while mixing.

Figure 1:
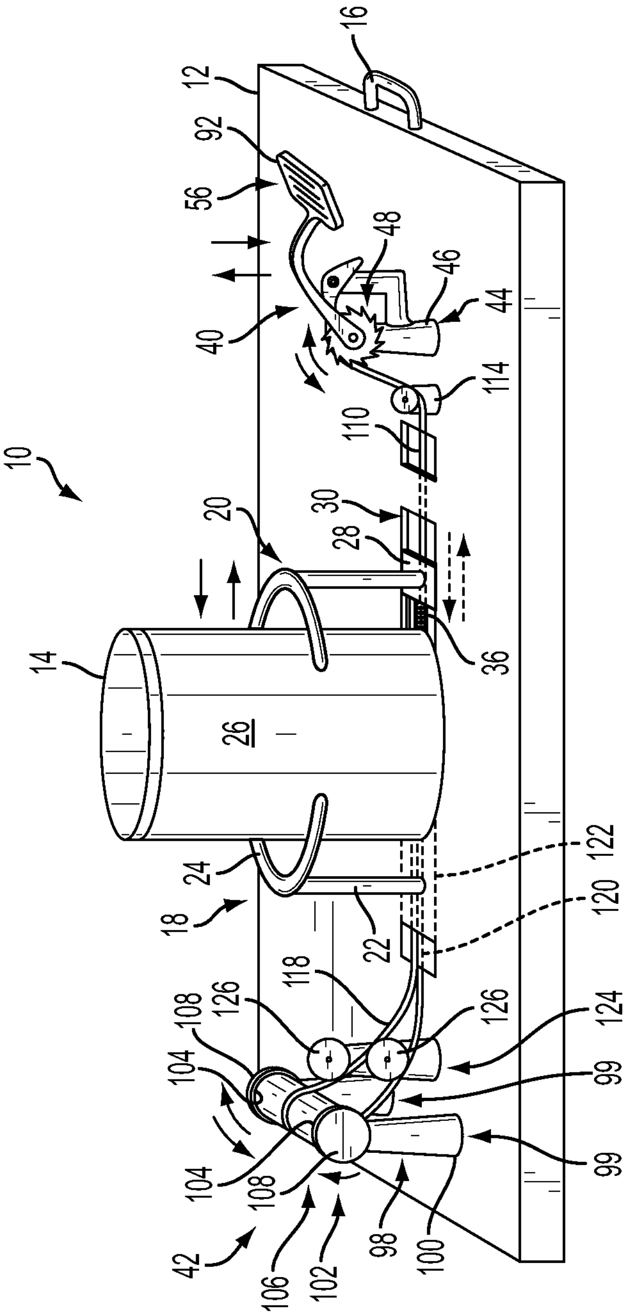
FIG. 1 is a perspective view of an embodiment of the present container mixing stand with the tensioning mechanism in the rest position.
Figure 2:
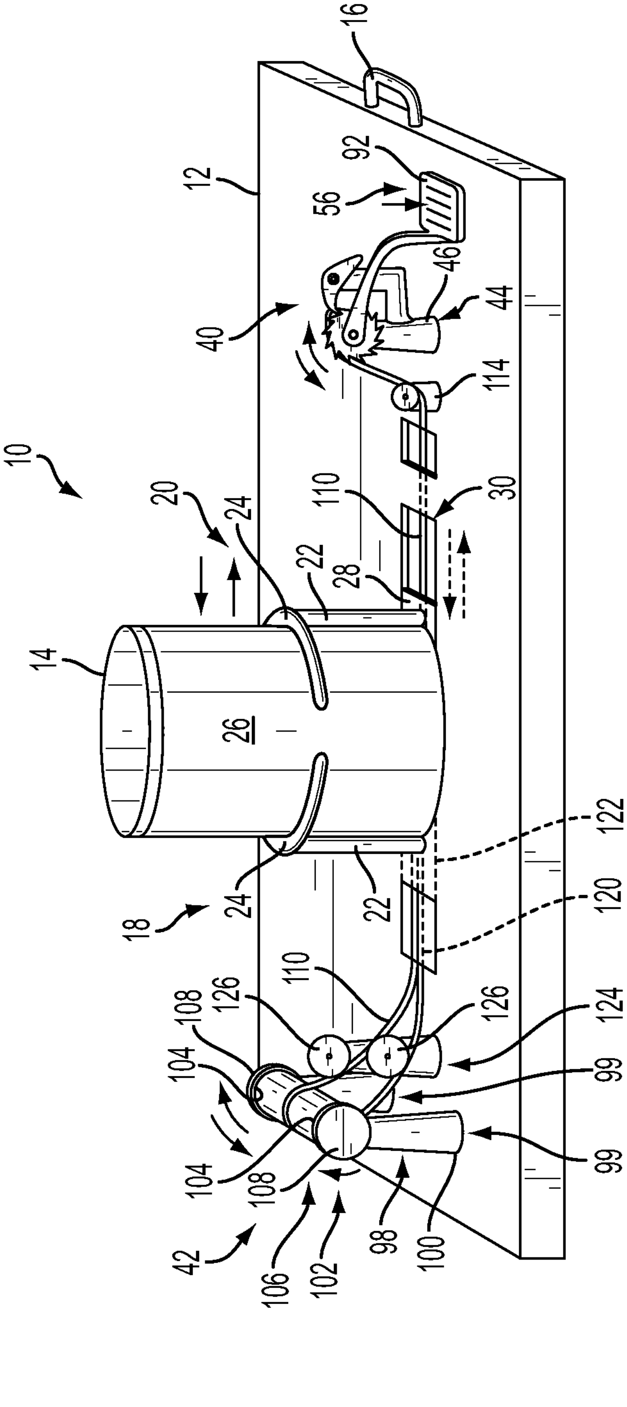
FIG. 2 is a perspective view of the container mixing stand of FIG. 1 with the tensioning mechanism in the tensioning position.
Figure 3:
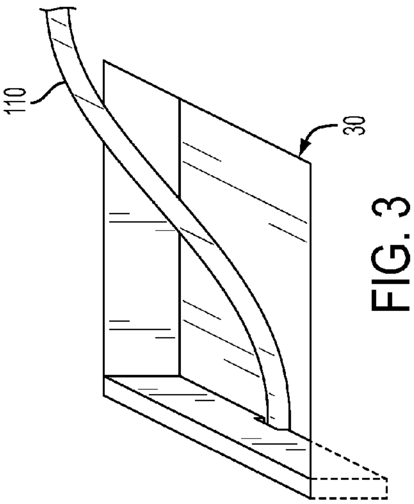
FIG. 3 is a schematic perspective view of the belt in an opening adjacent to the first pulley assembly.

Referring now to FIGS. 1-3, the present container mixing stand 10 includes a planar base plate or floor plate 12 having a preferably generally rectangular shape and a designated, uniform thickness. The base plate 12 has a length and width that is greater than the outer perimeter of a container 14 so that the container rests securely on a surface of the base plate. Provided that this dimensional condition is met, the base plate 12 can have any shape. Also, the base plate 12 is integrally formed and made of a durable material such as plastic, metal or any durable, suitable self-supporting material or combination of materials. It is contemplated that the container 14 is any type of rigid pail or bucket made of metal, plastic or the like. In the preferred embodiment, the container 14 is a conventional five gallon bucket. As shown in FIG. 1, a handle 16 is attached to an end of the base plate 12 to facilitate carrying the mixing stand 10.

First and second holding members 18, 20 are connected to the base plate 12 and are spaced apart so that the container 14 can be placed between the first and second holding members. Preferably, the first holding member 18 is fixed to the base plate 12 on one side of the container 14 and the second holding member 20 is movably connected to the base plate on an opposing side of the container. Each of the first and second holding members 18, 20 includes a vertically oriented support member 22 connected to a horizontally oriented curved container member 24. The support member 22 is an elongated, solid or hollow rod that is connected at one end to a center portion of the container member 24. As shown in FIG. 2, the container member has a curved, accurate shape that corresponds to the shape of an outside surface 26 of the typically cylindrical container 14 so that the container member positively engages the container exterior. The support member 22 and the container member 24 are preferably circular in cross-section and are made of a durable, self-supporting material such as metal or plastic. It should be appreciated that the support member 22 and the container member 24 may be made with any suitable material and have any suitable size or shape. In the illustrated embodiment, the first and second holding members 18, 20 have a height that is at least one-third the height of the container 14 to securely hold the container in position.

To enable the second holding member 20 to move relative to the base plate 12, a guide block 28 is connected to an end of the support member 22 of the second holding member. As shown in FIG. 3, the guide block 28 slidably fits within a generally, axially extending groove 30 defined by the base plate 12. Each side of the groove 30 has a designated undercut area 32 such that opposing, laterally-protruding members 34 of the guide block 28 extend into the undercut areas of the groove to slidably maintain the guide block within the groove. As shown in FIG. 1, the groove 30 is positioned to be parallel to a longitudinal axis of the base plate 12 for enabling the second holding member 20 to move reciprocally relative to the container.

Referring now to FIG. 3, a bias member, such as a coil spring 36, is connected to an inner end of the guide block 28 for biasing the guide block and thereby the second holding member 20 away from the container 14. An opposite end of the spring 36 is positioned against or connected to an inner end 38 of the groove 30, so that movement of the guide block 28 toward the container 14 compresses the spring 36 against the inner end, and where the spring biases the guide block away from the container.

Referring now to FIGS. 1-5, a pulley system is provided for moving the guide block 28, and thereby the second holding member 20, toward the container 14. The pulley system includes a first pulley assembly 40 positioned adjacent to the groove 30 on one side of the base plate 12, and a second pulley assembly 42 secured to an opposing side of the base plate 12 and positioned adjacent to the first holding member 18. The first pulley assembly 40 acts as a tensioning mechanism for moving the second holding member 20. In particular, the first pulley assembly 40 includes a mounting bracket or support bracket 44 having a first, lower end 46 and a second, upper end 48, where the first end is connected to the base plate 12 and the opposing, second end defines a through-hole 50.

Figure 4:
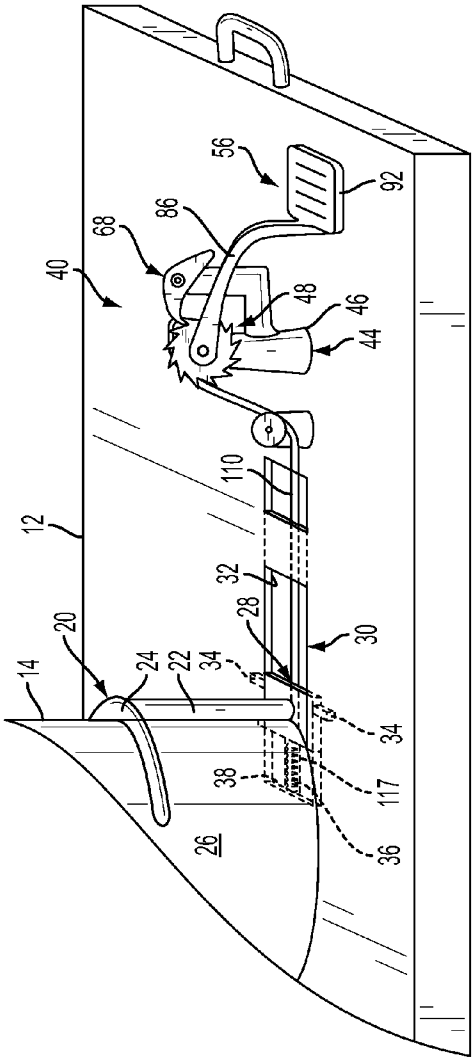
FIG. 4 is a fragmentary perspective view of a holding member and the first pulley assembly of the container mixing stand of FIGS. 1 and 2.
Figure 5:
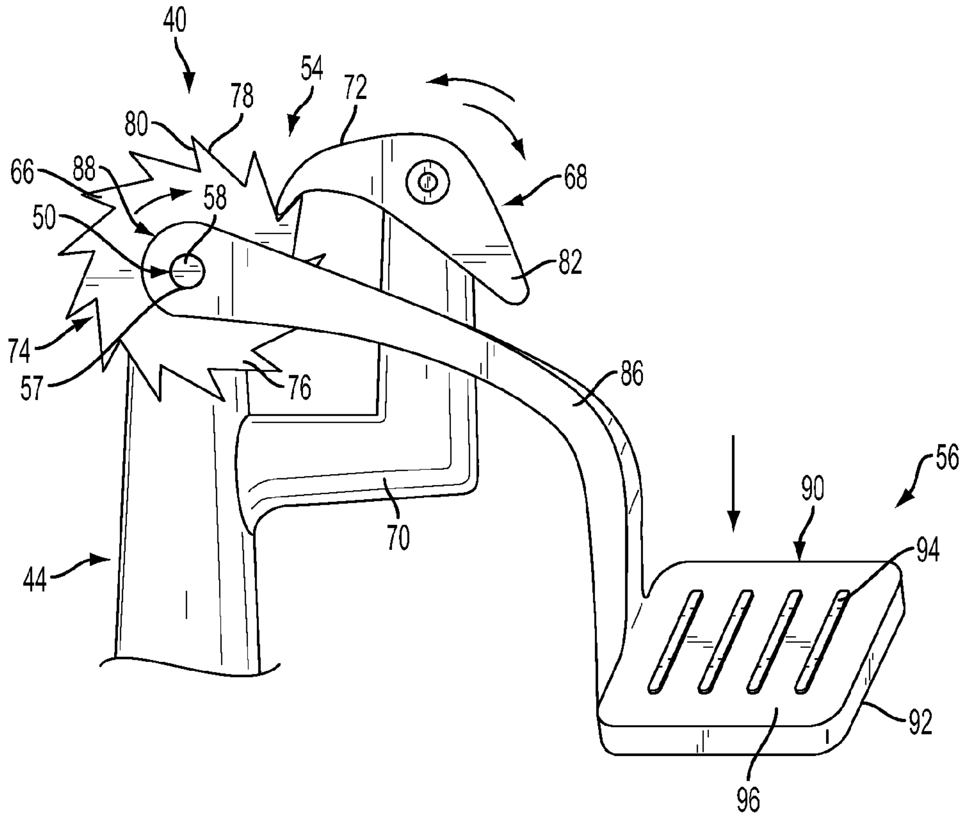
FIG. 5 is an enlarged perspective view of a side of the lever arm locking mechanism of FIG. 1.
Figure 6:
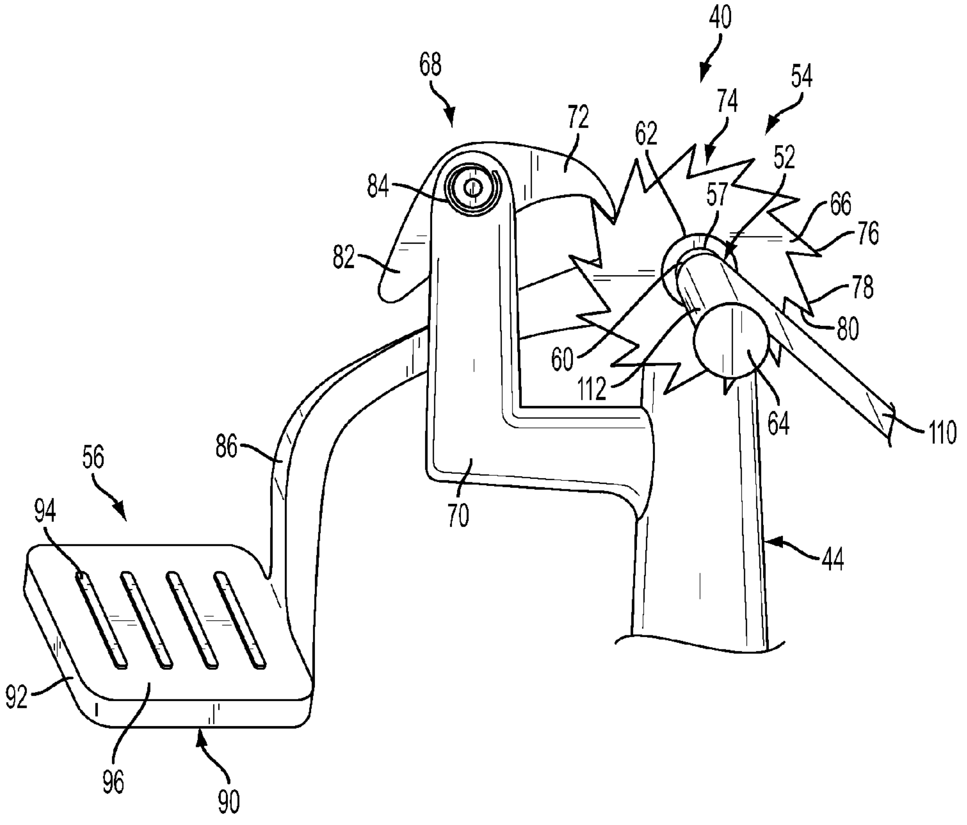
FIG. 6 is an enlarged perspective view the of lever arm locking mechanism of FIG. 4 showing the opposing side of the lever arm locking mechanism.

As seen in FIGS. 4-6, a first pulley 52 (FIG. 6), a pulley locking mechanism 54 and a lever arm 56, each have an aligning hole 57 for rotational engagement on the second end 48 of the support bracket 44. The aligning holes 57 are in registry with the through-hole 50. A pivot pin 58 is inserted through the through-hole 50 and the aligned holes and is secured in position by a nut, cotter pin or other suitable fastener. The first pulley 52 has a cylindrical body 60 with a first diameter and inner and outer flanges 62, 64, having a second diameter that is greater than the first diameter. It should be appreciated that the cylindrical body 60 of the first pulley 52 may have any suitable size or length, and may be solid or hollow.

The pulley locking mechanism 54 includes an oblique, toothed, locking gear 66 and a pawl 68 that is pivotally connected to an end of an "L"-shaped arm 70 connected to the support bracket 44. As shown in FIGS. 1, 5 and 6, the first pulley 52, the pulley locking mechanism 54 and the lever arm 56 are fixed together or otherwise keyed for common rotation where these components rotate in unison relative to the support bracket 44. To lock the first pulley 52 at a particular position, the first pulley is rotated to the position. As the first pulley rotates, the locking gear 66 also rotates.

A generally hook-shaped engagement end 72 of the pawl 68 is configured for engaging indentations 74 defined between a plurality of teeth 76 on the locking gear 66. The teeth 76 each have a generally triangular configuration such that the engagement end 72 of the pawl 68 slides or rides over a first longer, angled portion 78 of each tooth during clockwise rotation of the locking gear 66 and stops the engagement end in a particular indentation 74 when the engagement end contacts a second shorter portion 80 of one of the teeth (see FIGS. 5 and 6). Such engagement locks the locking gear 66 and thereby the first pulley 52 at a particular position during engagement of the mixing stand. It should be appreciated that while a specific type of pawl arrangement is described above, other types of pawls, ratcheting pawl arrangements and suitable pulley locking mechanisms are contemplated to lock the first pulley assembly 40. It should also be appreciated that the first pulley assembly 40 can be operated without the pulley locking mechanism pawl and locking gear.

To release the pulley locking mechanism 54, the pawl 68 includes an integral release lever 82 which dis-engages the engagement end 72 from the locking gear 66 when the release lever is pushed inwardly so that the locking gear can freely rotate in a counterclockwise direction as one views the second pulley assembly from the side shown in FIG. 5. A biasing member, such as a coil spring 84, is attached to the pawl 68 and biases the engagement end 72 into engagement with one of the indentations 74 on the locking gear 66. It should be appreciated that the spring 84 may be attached to a pawl axle or pivot member as shown in FIG. 6, attached to an end of the pawl or attached to any suitable portion of the pawl so that the engagement end 72 of the pawl is biased into engagement with the locking gear 66.

As shown in FIGS. 5 and 6, the lever arm 56 includes an elongated rod 86 with two ends 88, 90. One of the ends 88 is positioned between an end of the pivot pin 58 and the locking gear 66 and is secured in place by the pivot pin. Using flat spots, keys or other conventional devices, the lever arm 56 rotates in unison with the locking gear 66 and the first pulley 52. At the opposite end 90 of the lever arm 56 is a foot plate 92 which enables a user to manipulate the lever arm 56 with a foot. The foot plate 92 is offset from the rod 86 and has a planar, generally rectangular shape which allows the foot plate to rest squarely on the base plate 12 when the lever arm 56 is moved from a rest position (FIG. 1) to a tensioning position (FIG. 2). One or more gripping protrusions 94 extend upwardly from a top surface 96 of the foot plate 92 to provide grip and traction for a user's foot. Alternatively, a resilient gripping material such as rubber (not shown) may be placed on or applied as a coating to the top surface 96 of the foot plate 92.

As shown in FIGS. 1 and 2, a second pulley assembly 42 is positioned on an opposing side of base plate 12 from the first pulley assembly 40. The second pulley assembly 42 includes a mounting bracket or support bracket 98 having opposing support posts 99 each including a first end 100 connected to the base plate 12 and a second end 102 defining a through-hole 104 for receiving a second pulley or second axle 106. The second pulley 106 is rotationally engaged in the through-holes 104 of support members 99. At each end of the second pulley 106 are flanges 108. The diameters of the flanges 108 are greater than the diameter of the second pulley or axle 106 for keeping the ends of the second pulley 106 from sliding out of the through-holes 104.

Referring to FIGS. 1, 2 and 6, a belt 110 is attached at a first end 112 (FIG. 6) to the first pulley 52 and extends under a first guide roller 114 that is secured to the base plate 12. An opposing second end 117 of the belt 110 is looped over or around the second pulley 106 and attached to the guide block 28 as shown in FIGS. 1, 2 and 4. In operation, rotation of the first pulley 52 in a clockwise direction causes the second pulley 106 to rotate in a counterclockwise direction. Similarly, rotation of the first pulley 52 in a counterclockwise direction causes the second pulley 106 to rotate in a clockwise direction.

As shown in FIGS. 1, 2, 3 and 4, the belt 110 extends or loops around and is generally in contact with the second pulley 106 and extends into an opening 120 defined by the base plate 12. The opening 120 leads to a channel 122 defined within the base plate 12 that is in communication with the groove 30. A second guide roller 124 is secured to the base plate 12 and includes spaced rollers 126 that each rotatingly engage the belt 110 for respectively guiding the belt 110 to and from the second pulley 106 and into and out of the opening 120 and the channel 122. As stated above, the opposing end 117 of the belt 110 is attached to an end of the guide block 28 as shown in FIG. 4. As the second pulley 106 rotates in a counterclockwise direction, the guide block 28 is pulled toward the container 14 against the biasing force of the spring. When the second pulley 106 rotates in a clockwise direction, tension is released from the belt 110, allowing the spring 36 to bias the guide block 28 away from the container 14. It should be appreciated that the belt 110 may be made out of any suitable material or combination of materials, including but not limited to, woven nylon, canvas webbing, rope, and wire. It should also be appreciated that while a specific arrangement of guide rollers 124 are described, other arrangements and types of guide rollers are contemplated.

In operation, a user places a container 14 between the first and second holding members 18, 20. The user then places one foot on the base plate 12 near the first holding member 18 and places their other foot on the foot plate 92. As the user's foot pushes the foot plate 92 downwardly toward the base plate 12, the lever arm 56, the first pulley 52 and the pulley locking mechanism 54 rotate in unison in a clockwise direction, which in turn causes the second pulley 106 to rotate in a counterclockwise direction. As described above, the rotation of the first and second pulleys pulls on the belt 110, causing the guide block 28 to move inwardly until the second holding member 20 contacts the container 14. In the tensioning position (FIG. 2), the foot plate 92 rests on the top surface of the base plate 12 so that the user's foot rests stably on the base plate. Also as the foot plate 92 rotates to the tensioning position, the pawl 68 rides over the gear teeth 76. When the foot plate 92 is in the tensioning position shown in FIG. 2, the engagement end 72 of the pawl 68 engages the second portion 80 of one of the teeth, which locks the foot plate 92 and thereby the lever arm 56 in position.

When the user releases the downward force on the foot plate 92 and presses on the release lever 82 to release the engagement end 72 from the locking gear 66, the foot plate moves upwardly causing the first pulley 52 to rotate in a counterclockwise direction which causes a counterclockwise rotation of the second pulley 106. As a result, the tension on the belt 110 is released, and the spring 36 biases the guide block 28 outwardly away from the container 14, thereby moving the second holding member 20 away from the container. The container 14 is thus released for removal and use on a job site.

In an embodiment, where the first pulley assembly 40 does not include a locking mechanism, such as pulley locking mechanism 54 described above, a user pushes down the foot plate 92 into contact with the base plate 12 using their foot as described above and keeps their foot on the foot plate to secure the container in position until they are done mixing. The user then releases their foot from the foot plate or releases pressure on the foot plate to allow the foot plate to raise up and thereby release the container.

While particular embodiments of the present container mixing stand have been shown and described, it will be appreciated by those skilled in the art that changes and modifications may be made thereto without departing from the invention in its broader aspects and as set forth in the following claims.

What is claimed is:

1. A container mixing stand, comprising:

a base plate;

a first holding member connected to said base plate;

a second holding member movably connected to said base plate and spaced from said first holding member for receiving a container between said first and second holding members;

a first pulley assembly including a lever arm movable between a rest position and a tensioning position, said lever arm including a foot plate at one end, said foot plate being offset from said lever arm for enabling said foot plate to rest squarely on said base plate when said lever arm is in said tensioning position;

a second pulley assembly coupled with said second holding member and said first pulley assembly, wherein movement of said first pulley assembly from said rest position to said tensioning position causes said second pulley assembly to move said second holding member into contact with the container for securing the container in position during mixing.

2. The container mixing stand of claim 1, wherein each of said first and second holding members include a support member and a curved container support member connected to an end of said support member.

3. The container mixing stand of claim 1, further comprising a belt connected between said first pulley assembly and said second pulley assembly and between said second pulley assembly and said second holding member.

4. The container mixing stand of claim 3, further comprising at least one guide roller connected to said base plate, for rotationally engaging said belt.

5. The container mixing stand of claim 3, wherein said second holding member includes a guide block connected to said belt and configured for slidably engaging a groove defined by said base plate.

6. The container mixing stand of claim 3, wherein said second holding member includes a guide block configured for slidably engaging a groove defined by said base plate, a bias member connected to an end of said guide block for biasing the guide block in a first direction, an end of said belt being connected to said guide block for moving said guide block in a second, opposing direction against a biasing action of said bias member.

7. The container mixing stand of claim 3, wherein said base plate defines an elongated channel that has a first end at one side of the base plate and a second end at an opposing side of the base plate, said belt configured for extending through and moving within said channel.

8. A container mixing stand comprising:

a base plate defining an elongated channel having a first end at one side of said base plate and a second end at an opposing side of said base plate;

a first holding member and a second holding member connected to said base plate, one of said first and second holding members being movably connected to said base plate, said first and second holding members being spaced apart, defining a location for receiving a container between said first and second holding members;

a first pulley assembly including a mounting bracket connected to said base plate, a first pulley rotatably connected to said mounting bracket and a lever arm connected to said first pulley for common rotation, said lever arm being movable between a rest position and a tensioning position;

a second pulley assembly coupled with said second holding member and said first pulley assembly, said second pulley assembly including a second mounting bracket connected to said base plate and a second pulley rotatably connected to said second mounting bracket; and a belt connected between said first pulley and said second pulley and between said second pulley and said second holding member, said belt configured to extend through and move within said channel of said base plate, wherein movement of said lever arm from said rest position to said tensioning position causes said second pulley to move said second holding member into contact with the container for securing the container in position during mixing.

9. The container mixing stand of claim 8, further comprising a pulley locking mechanism connected to said first pulley for securing said first pulley in position when said lever arm is moved to said tensioning position.

10. The container mixing stand of claim 9, wherein said pulley locking mechanism includes a gear having a plurality of teeth connected to said first pulley and a pawl positioned adjacent to said gear, wherein said pawl is configured for engaging said teeth for releasably securing said first pulley in position.

11. The container mixing stand of claim 8, wherein each of said first and second holding members include a support member and a curved container support member connected to an end of said support member.

12. The container mixing stand of claim 8, further comprising two vertically spaced guide rollers each connected to said base plate, said guide rollers configured for rotatably engaging said belt.

13. The container mixing stand of claim 8, further comprising a plurality of guide rollers each connected to said base plate, said guide rollers configured for rotatably engaging said belt.

14. The container mixing stand of claim 8, wherein said second holding member includes a guide block configured for slidably engaging a groove defined by said base plate, said guide block being connected to an end of said belt.

15. The container mixing stand of claim 8, wherein said second holding member includes a guide block configured for slidably engaging a groove defined by said base plate and a bias member connected to an end of said guide block for biasing said guide block in a first direction, said belt being connected to said guide block for moving said guide block in a second, opposing direction against a biasing force exerted by said bias member.

16. The container mixing stand of claim 8, wherein said lever arm includes a foot plate at one end, said foot plate being offset from said lever arm for enabling said foot plate to rest squarely on said base plate when said lever arm is in said tensioning position.

17. A container mixing stand comprising:

a base plate;

a first holding member and a second holding member connected to said base plate, one of said first and second holding members being movably connected to said base plate, said first and second holding members being spaced apart, defining a location for receiving a container between said first and second holding members;

a first pulley assembly including a mounting bracket connected to said base plate, a first pulley rotatably connected to said mounting bracket and a lever arm connected to said first pulley for common rotation, said lever arm being movable between a rest position and a tensioning position, said lever arm including a foot plate at one end, said foot plate being offset from said lever arm for enabling said foot plate to rest squarely on said base plate when said lever arm is in said tensioning position;

a second pulley assembly coupled with said second holding member and said first pulley assembly, said second pulley assembly including a second mounting bracket connected to said base plate and a second pulley rotatably connected to said second mounting bracket;

wherein movement of said lever arm from said rest position to said tensioning position causes said second pulley to move said second holding member into contact with the container for securing the container in position during mixing.

* * * * *